Nov. 21, 1967  A. B. FORD  3,353,254
PART FEEDING APPARATUS
Filed June 7, 1965  2 Sheets-Sheet 1
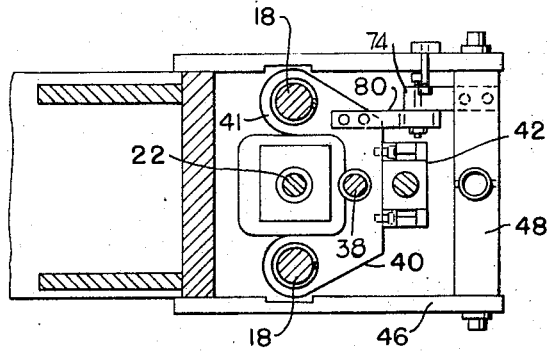
FIG. 3
FIG. 2
FIG. 1
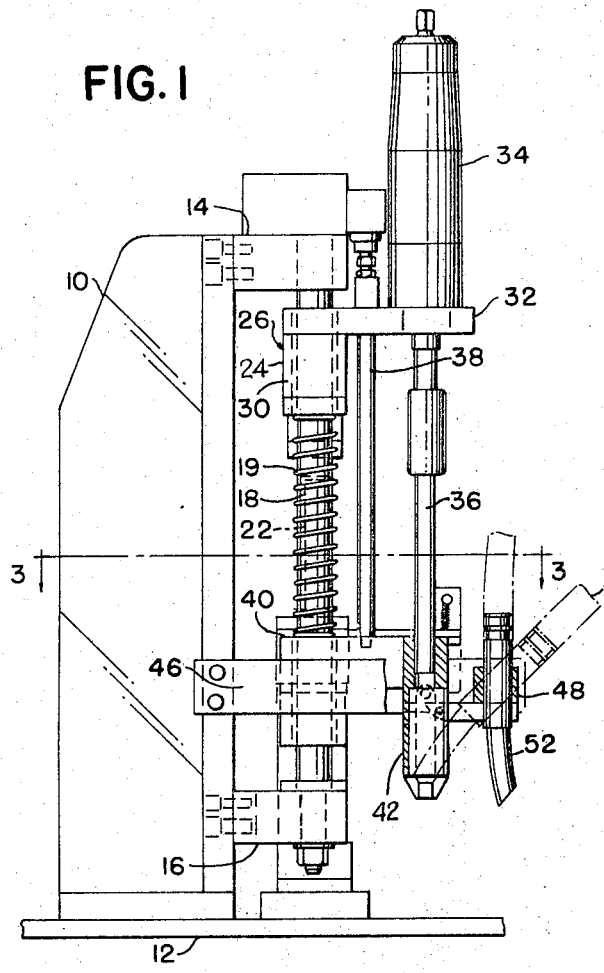
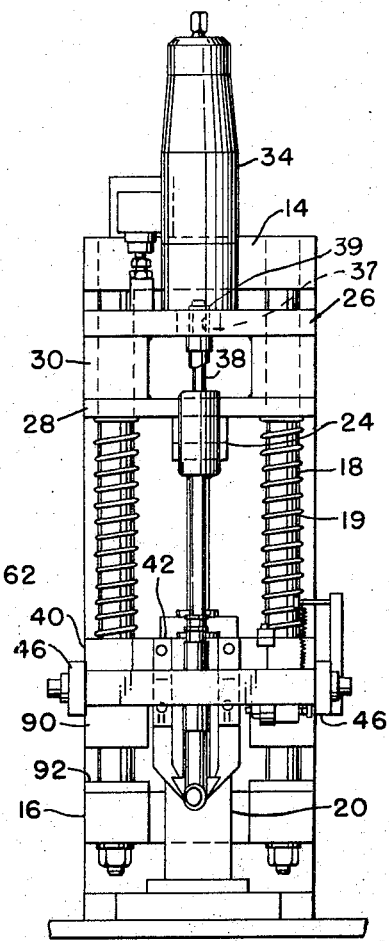
INVENTOR.
ARNOLD B. FORD
BY Whittemore
Hulbert & Belknap
ATTORNEYS Nov. 21, 1967  A. B. FORD  3,353,254
PART FEEDING APPARATUS
Filed June 7, 1965  2 Sheets-Sheet 2
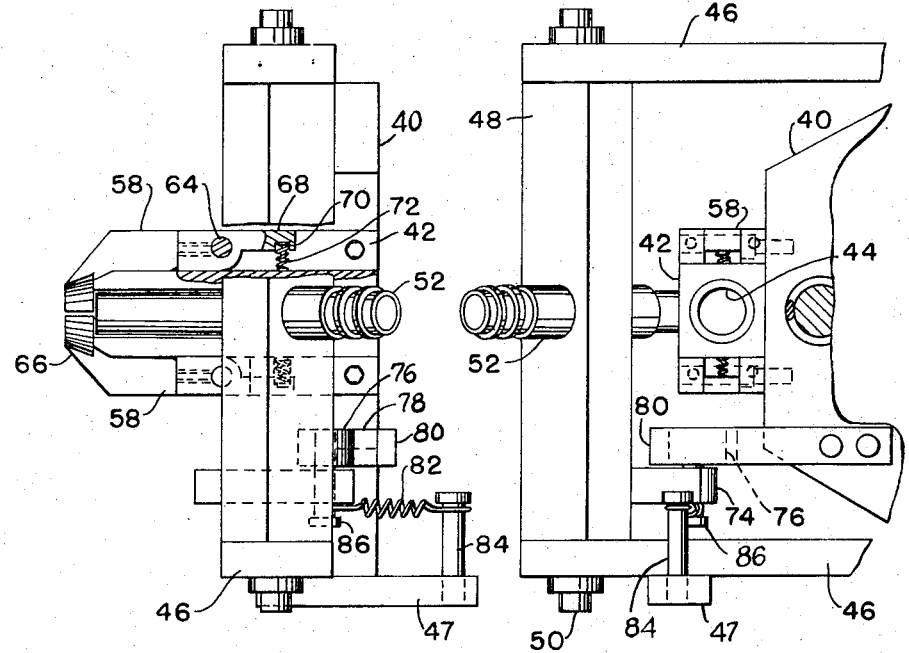
FIG. 6  FIG. 5
FIG. 4
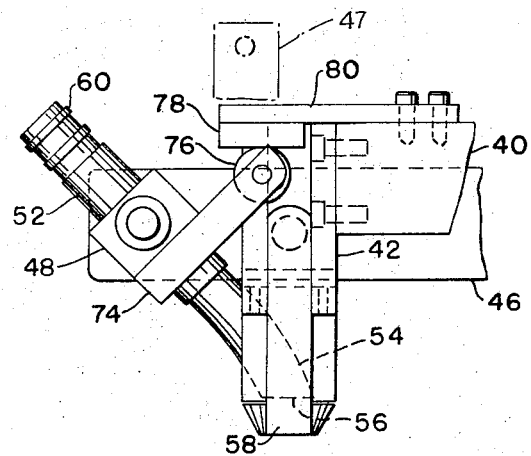
INVENTOR.
ARNOLD B. FORD
BY Whittemore,
Hulbert & Belknap
ATTORNEYS

United States Patent Office 3,353,254
Patented Nov. 21, 1967

3,353,254
PART FEEDING APPARATUS
Arnold B. Ford, Livonia, Mich., assignor to Feedmatic-Detroit, Inc., Southfield, Mich., a corporation of Michigan
Filed June 7, 1965, Ser. No. 461,885
6 Claims. (Cl. 29—240)

The present invention relates to part feeding apparatus, and more particularly, apparatus designed for automatically delivering parts, one at a time, to assembly equipment.

In the past, apparatus of this general type has been provided and has proved quite satisfactory if the shape of the parts is such as to minimize difficulties arising from the parts becoming misaligned or tumbling in transit or more particularly, as they are moved from the end of a delivery conduit to assembly mechanism such for example as a press, screw driver, or the like.

It is an object of the present invention to provide apparatus of the class described characterized in its ability to handle parts susceptible to becoming misaligned or tumbling in transit, and to feed these parts in properly oriented position to assembly apparatus.

More particularly, it is an object of the present invention to provide apparatus of the character described comprising releasable part-holding means, movable part-assembling means, and a delivery device movable into position directly adjacent said part-holding means for delivering the part directly into the part-holding means in properly oriented position, said delivery device being movable into and out of delivery position to first deliver a part into the holding means and then to move into a clearance position to provide for operation of the part-assembling means.

It is a further object of the present invention to provide apparatus of the character described in which the part-holding means comprises a pair of jaws, and resilient means urging the jaws towards each other in part-holding relationship.

It is a further object of the present invention to provide apparatus as described in either of the two preceding paragraphs in which the part-assembling means is movable in a path extending through the jaws so as to push or otherwise impel a part through the jaws into assembled relation with the work.

It is a further object of the present invention to provide apparatus as described in any of the three preceding paragraphs in which the part delivery device comprises a conduit to which the parts are projected by air pressure, and a delivery nozzle having an end portion movable into position directly adjacent the jaws.

Other objects and features of the invention will become apparent as the description proceeds, especially when taken in conjunction with the accompanying drawings, illustrating a preferred embodiment of the invention, wherein:

FIGURE 1 is a side elevation of assembly apparatus including the part feeding apparatus.

FIGURE 2 is a front elevation of the asrembly apparatus shown in FIGURE 1.

FIGURE 3 is a horizontal section on the line 3—3, FIGURE 1.

FIGURE 4 is an enlarged fragmentary elevational view showing the relationship between the delivery nozzle and jaws.

FIGURE 5 is a plan view of the structure shown in FIGURE 4, taken approximately in the plane of the line 3—3, FIGURE 1.

FIGURE 6 is a fragmentary front elevational view of the part shown in FIGURE 6, with parts broken away.

The assembly apparatus comprises a column 10 fixed to a base 12 having forwardly extending brackets 14 and 16 affixed thereto. Extending between the brackets and rigidly secured thereto are a pair of guide rods 18 each surrounded by a compression spring 19.

Affixed to the base 12 is an air cylinder 20 having a vertically extending piston rod 22 secured at its upper end to a block 24 rigidly secured to a guide frame indicated generally at 26 and comprising a bottom strap 28, a pair of vertical sleeves 30, and a top plate 32. Mounted on the plate 32 is power applicator mechanism 34 such for example as a nut runner having tooling including the shaft 36 coupled thereto. The applicator mechanism might conceivably be in the form of a screw driver, a press element for pressing a plug into a recess, or any other convenient structure. The present invention is concerned basically with delivering parts into a position to be gripped by locating jaws and then moved into assembled relation by the applicator mechanism. The guide frame 26 is vertically movable on rods 18 by a piston rod 22.

Extending through a bushed opening 37 in the plate 32 is a rigid tie-rod 38 having an abutment 39 secured to its upper end. The lower end of rod 38 is fixed to a lower bearing holder plate 40 having laterally extending arms 41 provided with bearings slidable longitudinally on the vertical guide rods 18.

Connected to the lower bearing holder plate 40 is a gun 42 having an opening 44 therethrough, as best seen in FIGURE 5, through which the shaft 36 or tooling carried thereby is adapted to extend.

Secured to the column 10 are a pair of forwardly extending arms 46 the outer ends of which are connected by a pivot bar 48 adapted to rock about a longitudinal pivot axis established by pivot support means 50. The bar 48 has an opening therethrough which receives a tube 52 having one end bent as indicated at 54 in FIGURE 4 so that the end surface 56 of the tube is located directly above a pair of jaws 58, the bent end of the tube constituting in effect a nozzle which is adapted to deliver a part directly into the jaws while preventing any possibility of the part becoming disoriented or tumbling. The tube 52 has the other end provided with ribs 60 adapted to cooperate wtih a delivery tube 62 through which the parts are delivered one at a time by air pressure supplied behind the individual part.

The jaws, the shape of which is best seen in FIGURE 6, are individually pivoted as indicated at 64 and the ends 66 of the jaws are appropriately shaped in accordance with the particular shape of the part so that the part is gripped and resiliently held when delivered from the tube or nozzle 52. The jaws 58 are provided with ears 68 which are recessed as indicated at 70 for the reception of compression springs 72 positioned so as to urge the jaws towards each other.

The pivot bar 48 has secured thereto an arm 74 carrying a roller 76 in position to be engaged by a block 78 secured to an arm 80 attached to the plate 40.

The bar 48 is urged to the position best illustrated in FIGURE 4 by a tension spring 82 one end of which is connected to a pin 84 carried by an arm 47, and the other end is connected to a pin 86 connected to the arm 74.

With the parts in the position shown in FIGURE 4, an assembly part, which may be a plug, a screw, a nut, or other part intended for assembly into a work piece, is advanced through the conduit or delivery tube 62 and the tube 52 by air pressure and is forcibly expelled from the end thereof directly into the pivoted jaws 58. These jaws are appropriately shaped to grip the piece and to hold it until engaged by mechanism later to be described.

It is to be emphasized at this time that if the tubing merely opened into a passage traversed by the applicator mechanism then, particularly for certain shapes of parts, there is a possibility of the part becoming misoriented or tumbling with resultant jamming of the mechanism. However, as is readily apparent from FIGURE 4, the part is guided through the conduit and tube until expelled under considerable velocity from the nozzle end thereof directly into the resiliently urged jaws 58.

Thereafter, fluid is admitted to the cylinder 20 and will move the frame 26 and associated structure, as well as the lower holder plate 40 downwardly. Initial downward movement of this structure causes the block 78 to swing the pipe or tube 52 to the inoperative position illustrated in full lines in FIGURE 1, by engagement with the roller 76 on the arm 74. This swinging movement of the curved end nozzle portion 54 of the pipe 52 is permitted without interference with the jaws 58 because the jaws move downwardly together with the lower plate 40 as the nozzle portion 54 of the pipe 52 is swung into the clearance position shown in full line position in FIGURE 1.

Downward movement of the plate 40 and the mechanism connected thereto is terminated by engagement between depending tubular projections 90 on the plate 40 with bumper elements 92 on the generally U-shaped bracket 16. Thereafter, as the frame 26 continues to move downwardly on the guide rods 18, the springs 19 are compressed and the shaft 36 coupled to the applicator mechanism 34 moves downwardly through the gun 42, pushing or moving the part through the resiliently urged jaws 58 and applying the part to the work piece. It will of course be appreciated that this movement is permitted at this time because the nozzle portion 54 of the tube 52 has been cammed to the full line clearance position. It will further be understood that the tool which applies the part to the work piece may be simply a punch or rod if the parts are pressed into assembled position, or it may be rotated and the applicator be in the form of a tool such for example as a screw driver or socket headed wrench if the parts are to be screwed into position.

Upon reverse movement, initial upward movement of the frame 26 by the piston rod associated with the cylinder 20 will move the tool or applying device upwardly through the resiliently urged jaws 58 into an upper limiting position such for example as illustrated in FIGURE 1. After the element or shaft 36 has moved to clearance position then the spring 82 rocks the nozzle portion 54 of the tube 52 into the position shown in FIGURE 4, preparatory to feeding of another part to the jaws by application of air to a part received in the tube or conduit 62.

The drawings and the foregoing specification constitute a description of the improved part feeding apparatus in such full, clear, concise and exact terms as to enable any person skilled in the art to practice the invention, the scope of which is indicated by the appended claims.

What I claim as my invention is:

1. Applicator apparatus comprising a column having guide rods fixed thereto, a frame slidable on said guide rods, applicator mechanism carried by said frame, a holder plate movable on said guide rods, springs on said guide rods interposed between said frame and said holder plate, said holder plate including a part holder having resilient jaws for gripping and releasably engaging a part, power means for moving said frame and said holder plate as a unit on said guide rods to move a part held by said jaws towards a work piece, means on said frame for arresting movement of said plate, said springs permitting continued movement of said frame and applicator to provide for movement of a tool carried by said applicator relative to said part holder, a part feeding member movably carried by said column for movement between part feeding position directly adjacent said jaws and a clearance position in which it is moved away from said jaws to provide for movement of the tool carried by the applicator to engage a part carried by the jaws and to apply the part to the work piece.

2. Apparatus as defined in claim 1 in which said part feeding member comprises a nozzle, and means pivoting the nozzle to provide for movement of its discharge end into and out of part discharging position directly adjacent said jaws.

3. Apparatus as defined in claim 2 comprising cam means operable during the simultaneous movement of said frame and holder to move said part feeding member away from said jaws and into clearance position to provide for movement of the tool into engagement with the part.

4. Apparatus as defined in claim 3 in which the cam means is effective to retain the part feeding member in clearance position until the tool carried by said applicator has moved into clearance position and to thereafter provide for movement of the part feeding member into feeding position prior to completion of the return movement of said holder to initial position to position the discharge end of said part feeding member directly adjacent the jaws.

5. Part applying apparatus comprising a frame, a part holder including resilient jaws movable on said frame between a loading position and an operating position to receive a part for insertion into a work piece at the loading position and to move it to working position, an applicator movable on said frame with said part holder during initial movement thereof and movable on said frame relative to said part holder after said part holder has reached working position, said applicator including a tool movable relative to said holder to engage a part received thereby and to insert it into a work piece, a part feeding member pivoted to said frame, means for moving said part feeding member into position directly adjacent the jaws of said holder to provide for discharge of a part from the part feeding member directly into said jaws, camming means on said part holder operable to pivot said part feeding member away from said jaws upon initial movement of said holder and said applicator from loading to working position, means for arresting movement of said holder, and means providing for continued movement of said applicator relative thereto, said frame including parallel guide rods, said part holder and said applicator being independently movable on said guide rods, a tie rod extending between said part holder and applicator effective to limit separation between said part holder and applicator but to provide for relative approach, resilient means interposed between said part holder and applicator, and power means connected directly to said applicator to effect direct movement thereof, movement of said applicator operating through said resilient means to effect the movement of said part holder during initial movement of said applicator.

6. Part applying apparatus comprising a frame, rectilinear guide means on said frame, a part holder movable along said guide means, an applicator movable along said guide means, means connecting said holder and applicator to limit separation therebetween, resilient means disposed between said holder and applicator yieldable to permit said applicator to move relative to said holder, abutment means acting between said frame and holder, actuating means connected between said frame and applicator operable to move said applicator and holder as a unit until movement of said holder is arrested by said abutment means, and to thereafter move said applicator relative to said holder as permitted by said resilient means, a part feeder on said frame having a portion movable into a position directly adjacent said holder and in the path of movement of said applicator relative to said holder, and camming means including a part connected to said feeder and a part engageable therewith carried by said holder operable during initial movement of said holder in unison with movement of said applicator therewith to move said feeder out of the path of movement of said applicator prior to initiation of movement of said applicator relative to said holder.

References Cited

UNITED STATES PATENTS

| 2,820,494 | 1/1958 | Haberstump | 144—32 |
| 3,049,713 | 8/1962 | Dupuy et al. | 227—112 |
| 3,050,836 | 8/1962 | Cressman et al. | 29—211 X |
| 3,283,791 | 11/1966 | Weber | 144—32 |

WILLIAM FELDMAN, *Primary Examiner.*

J. C. PETERS, *Assistant Examiner.*